March 15, 1938.　　　　F. T. IRGENS　　　　2,111,245

PROPELLER MOUNTING

Filed April 5, 1935

INVENTOR
Finn T. Irgens
BY Wheeler, Wheeler and Wheeler
ATTORNEYS

Patented Mar. 15, 1938

2,111,245

UNITED STATES PATENT OFFICE 2,111,245

PROPELLER MOUNTING

Finn T. Irgens, Wauwatosa, Wis., assignor to Outboard Motors Corporation, Milwaukee, Wis., a corporation of Michigan Application April 5, 1935, Serial No. 14,876

3 Claims. (Cl. 170—173)

This invention relates to improvements in propeller mountings.

It is the object of the invention to provide a propeller which will be self-balancing, free of vibration, and universally yieldable to elastically absorb shock. I accomplish these results by interposing an annular rubber cushion, or equivalent elastic support, between the propeller hub and the shaft upon which the propeller is mounted.

I am aware that spring cushioned drives between propeller shafts and propellers have heretofore been used and patented. A spring cushions shock in a direction peripherally of the propeller but is incapable of providing the type of universally yieldable mounting herein proposed. The present invention is peculiarly applicable to outboard motor practice and to other marine devices wherein propellers are operated in shallow waters.

It is a further object of the invention to provide a propeller mounting combining the protection of a shear pin and a cushion drive.

In the drawing.

Like parts are identified by the same reference characters throughout the several views.

Figure 1:
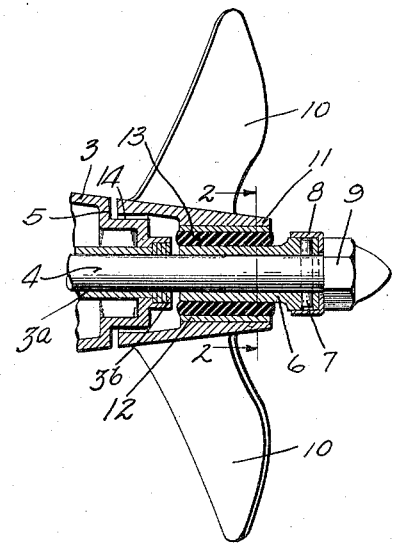
Figure 1 is an axial section through a propeller and its mounting embodying the present invention.
Figure 2:
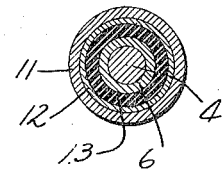
Figure 2 is a transverse section on the line 2—2 of Fig. 1.

The housing or support 3 from which the propeller shaft 4 projects, is preferably shouldered at 5. The shaft turns in a bearing 3a which includes packing at 3b. The externally projecting portion of the propeller shaft carries a sleeve at 6 constituting a universal propeller mounting which is secured against rotation on the shaft solely by means of a shear pin 7. A conventional cup-shaped retainer 8 prevents the loss of the shear pin and is held in place over the end of sleeve 6 by the usual retaining nut 9 which is screw threaded to the end of the propeller shaft.

The propeller blades 10 are carried by a hub 11 which is preferably extended to be complementary to the shouldered portion 5 of the housing, being spaced therefrom sufficiently at 14 to permit the propeller to tilt bodily with respect to the shaft for a limited amount when the blades encounter an obstruction. The hub is spaced from the sleeve 6 by means of the bushing 12 fixed in the hub as a part thereof and the annular cushion 13 which is preferably made of rubber or some like elastic material. In practice the cushion is usually vulcanized either to the sleeve 6 or the bushing 12 or both, but vulcanization is not essential since the rubber is inserted under compression sufficient to fix it against displacement with reference to either of these members. The degree of compression is indicated by the fact that the rubber annulus bulges at its ends in the manner clearly apparent in Fig. 1.

The rubber comprising the cushion is preferably soft enough to have a substantial yielding characteristic. In many instances when the propeller strikes a submerged obstacle such as a stump or a stone, the rubber cushion will permit the propeller to yield sufficiently (as much as 90°) to clear the obstacle without damage to the pin 7 which would otherwise have been sheared by the impact. The mechanism driving the shaft 4 is likewise saved much shock where the rubber cushion is used, as compared with the shock which would be experienced if the propeller were coupled directly to the shaft solely by means of the frangible pin 7.

Aside from its ability to absorb shock imparted in a peripheral direction, the rubber cushion 13 has numerous advantages in that it permits the propeller to yield universally in any direction with respect to the shaft 4. It is seldom that a shock incurred by a propeller is directed peripherally thereof. The rubber cushion 13 permits the entire propeller to be displaced against elastic resistance diametrically of the shaft, and also permits elastic displacement of the propeller angularly from the normal plane of rotation. Thus it saves the shaft from many shocks other than those from which the shaft is protected by a mere shear pin connection. The propeller is in balance about a point falling within the cushion because its blades are located in an annular series surrounding the cushion instead of being offset axially therefrom.

The propeller is rotated at high speed and is sometimes unbalanced either by reason of a defect in manufacture or some injury which it has sustained. The use of a cushion at 13 leaves the propeller free to vibrate independently of the shaft in response to its eccentric loading, and thereby saves the shaft and the associated mechanism from such vibration.

It very frequently happens that a propeller which has once encountered a submerged obstacle may have one of its blades or flukes bent so that its pitch is incorrect. The presence of the cushion 13 permits the propeller to adjust itself under such conditions to an angle with respect to its shaft such that the thrust delivered from all of the blades is uniform. This feature also eliminates much vibration and wear of the shaft and associated mechanism which occur when the propeller has fixed bearings determining its position respecting the shaft.

I claim:

1. A marine propeller assembly comprising in combination a propeller having a hub, a drive shaft extending into the hub, a sleeve on said shaft, a frangible shear pin connecting the sleeve to the shaft, an annular cushion confined between said hub and said sleeve and providing a universal propeller mounting and an elastic driving connection from the drive shaft to said propeller, said hub being wholly dependent upon said cushion for its position rotatably and tiltably with respect to said drive shaft, and said cushion being sufficiently elastic to accommodate self-adjustments of the propeller in equilibrium upon said sleeve and to allow a substantial torsional displacement of said hub relative to the drive shaft of such degree as to enable the propeller to clear submerged obstructions, and also acting to prevent the shear pin from being broken when the propeller meets an obstruction.

2. A marine propeller assembly comprising in combination, a propeller having a set of blades and a hub, a drive shaft, a support for the drive shaft, said hub having its forward portion surrounding and spaced from said support to permit tilting of the hub, an annular cushion confined between said hub and said shaft at the rear of said support, said cushion arranged to form a supporting connection between said shaft and said hub and to provide a universal propeller mounting and an elastic driving connection from the drive shaft to said propeller, said hub being wholly dependent upon said cushion for its position rotatably and tiltably with respect to said drive shaft, said blades being located in an annular series surrounding the cushion so that the propeller is in balance about a point falling within the cushion, and said cushion being sufficiently elastic to accommodate self-adjustments of the propeller in equilibrium upon said sleeve and to allow a substantial torsional displacement of said hub relative to the drive shaft of such degree as to enable the propeller to clear submerged obstructions.

3. A marine propeller assembly comprising in combination a drive shaft support, a drive shaft projecting therefrom, an annular cushion upon the shaft, a propeller having its hub mounted on the cushion in spaced relation to the shaft and to the shaft support, and a set of blades located in an annular series surrounding the cushion so that the propeller is in balance about a point falling within the cushion, said cushion being confined between the propeller hub and shaft to provide an elastic driving connection from the drive shaft to the propeller, and a universal propeller mounting upon which said hub is wholly dependent for its position rotatably and tiltably with respect to said shaft, said cushion being sufficiently elastic to accommodate self-adjustments of the propeller in equilibrium upon said cushion and to allow a substantial torsional displacement of said hub relative to the shaft to a degree sufficient to enable the propeller to clear submerged obstacles.

FINN T. IRGENS.